United States Patent [19]

Corathers et al.

[11] Patent Number: 5,434,755
[45] Date of Patent: Jul. 18, 1995

[54] ILLUMINATION SYSTEM FOR A LIGHT EMITTING PANEL

[75] Inventors: David A. Corathers, Summit County; Peter A. Morell; Oral G. Lyons, both of Cuyahoga County; Mark J. Duewiger, Lake County, all of Ohio

[73] Assignee: Allen-Bradley Company, Inc., Milwaukee, Wis.

[21] Appl. No.: 101,888

[22] Filed: Aug. 4, 1993

[51] Int. Cl.6 ............................................... F21V 8/00
[52] U.S. Cl. ................................. 362/32; 362/253; 362/219; 40/547; 315/160
[58] Field of Search ................. 362/31, 32, 125, 127, 362/133, 249, 372, 253, 269, 20; 40/547; 312/223.5; 359/83, 49, 42; 315/316, 292, 160

[56] References Cited

U.S. PATENT DOCUMENTS

| | | | |
|---|---|---|---|
| 2,765,544 | 10/1956 | Neveroski, Jr. | 362/125 |
| 3,564,233 | 2/1971 | Cox | 40/547 |
| 4,034,215 | 7/1977 | Hashimoto | 362/32 |
| 4,128,298 | 12/1978 | McMillan | 362/32 |
| 4,335,421 | 6/1982 | Modia et al. | 362/125 |
| 4,747,648 | 5/1988 | Gilliland, III | 40/547 |
| 4,917,448 | 4/1990 | Oppenheimer | 362/32 |

FOREIGN PATENT DOCUMENTS 2679363  1/1993  France ................... 40/564

Primary Examiner—Ira S. Lazarus
Assistant Examiner—Y. Quach
Attorney, Agent, or Firm—John D. Franzini; John J. Horn; H. Fred Hamann

[57] ABSTRACT

A system for illuminating a light emitting panel for backlighting a visual display positions the panel behind the visual display at a front wall of a processor cabinet. The light emitting panel has at least one layer of optical fibers which extend from the panel and are bundled and terminated in one or more receptors which are mounted in the cabinet remote from the panel and visual display. A cover is hinged to the cabinet and mounts a light source in operative alignment with the receptors when the cover is closed to illuminate the panel and display. The cover can be swung open to position the light source in a maintenance position in which light bulbs of the source can be removed and replaced.

10 Claims, 2 Drawing Sheets

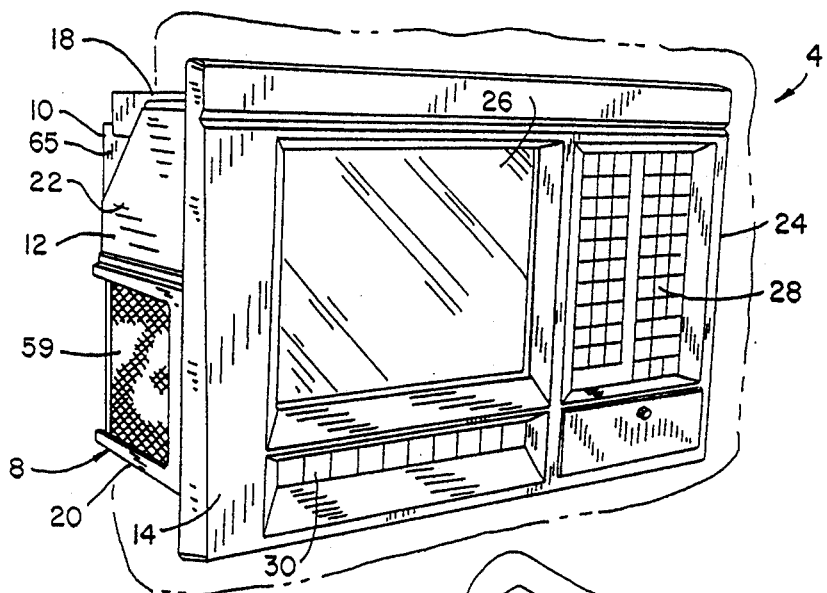
FIG. 1
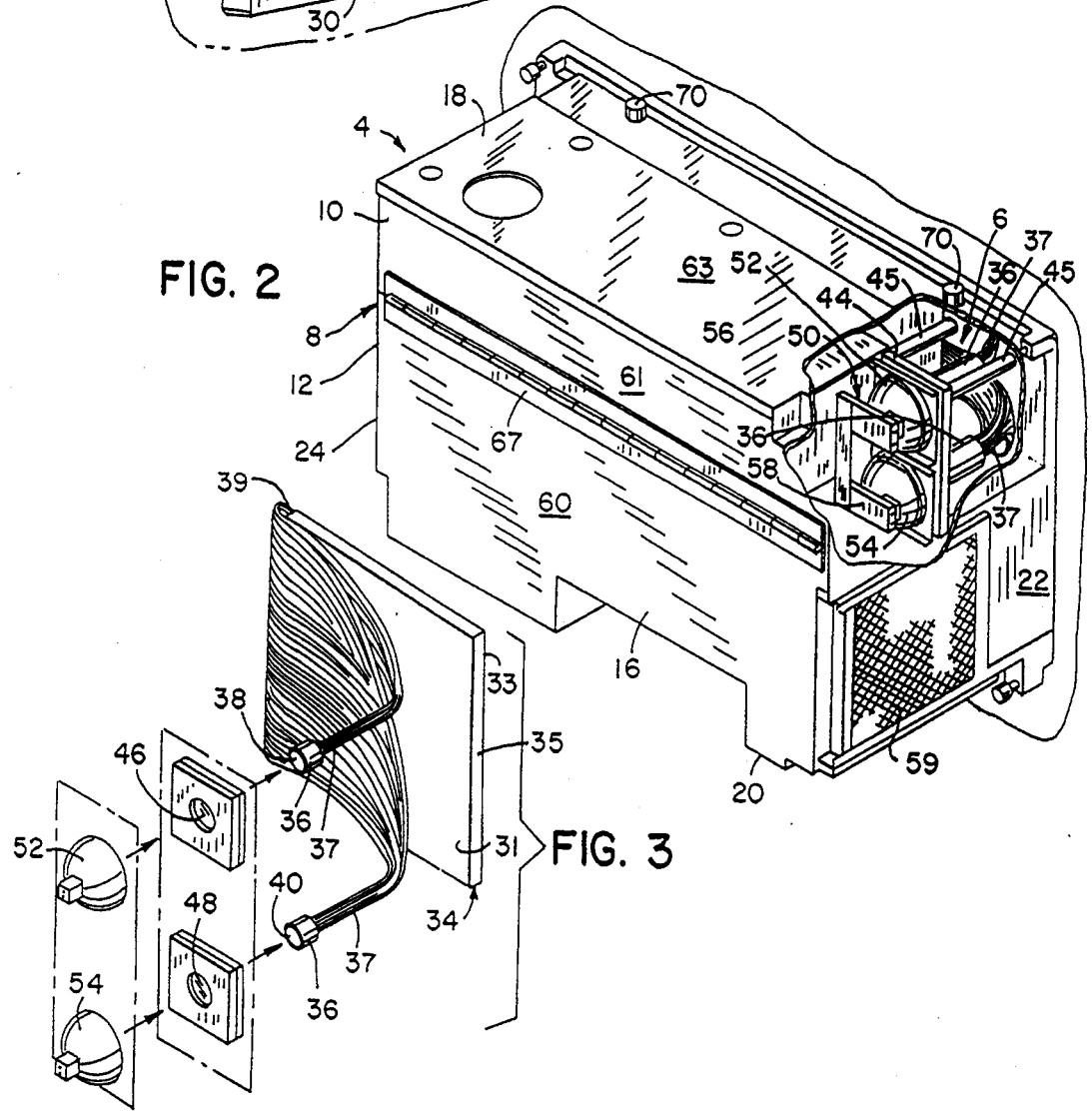
FIG. 2
FIG. 3

ILLUMINATION SYSTEM FOR A LIGHT EMITTING PANEL

FIELD OF THE INVENTION

This invention relates to a system for illuminating a light emitting panel which is particularly adapted for backlighting a visual display.

BACKGROUND OF THE INVENTION

Liquid crystal displays and more recently thin film transistor displays are well known and used in many applications. These types of displays are commonly used in connection with computers, programmable controllers, calculators and other digital processors for displaying information.

For these types of displays to be effective, light must be transmitted through the back of the display panel toward the observer, who is in front of the display. This is known as backlighting and is also well known. Different types of light sources have been used for backlighting thin film transistor and liquid crystal displays, including light emitting panels of the type which is made of optical fibers usually woven into a mat and provided with a reflector layer at the rear surface of the mat so that the light from the panel is emitted out the front of the mat and through the display. A diffuser panel may be provided over the front of the mat to enhance dispersion and uniformity of the light emitted. In such panels, several layers of optical fiber mat may be provided, depending upon the intensity of the emitted light desired.

When a light emitting panel of this type is used for display backlighting, provision must be made for illuminating the light emitting panel itself. This is usually accomplished with halogen light bulbs or light emitting diodes. Halogen bulbs have the advantage of being able to provide high intensity light, but have the disadvantage of having a limited life which requires periodic replacement of the bulb. Because these bulbs have been provided inside the cabinet of a digital processor, access for replacing the bulbs has been difficult. Also, turning off the power to replace the bulbs has also had the disadvantage of causing down time of the digital processor.

SUMMARY OF THE INVENTION

The invention provides an illumination system for a light emitting panel which is mounted to a cabinet and positioned so as to emit light out a front wall of the cabinet. The panel includes optical fibers which terminate at a receptor for receiving light from a light source for illuminating the panel. The light source includes a light emitting bulb and is hinged to the cabinet. As such, the light source can be pivoted between an emit position in which the source is in operative relation to the receptor so that the bulb is in position to emit light into the receptor to illuminate the light emitting panel, and a maintenance position. In the maintenance position, the bulb is out of the emit position and in a position in which the bulb is easily accessible for replacement.

In an especially useful aspect, the cabinet includes a chassis and a cover which is hinged to the chassis to be pivoted between an open and a closed position. The light source is mounted to the cover so that in the closed position of the cover the light source is in the emit position and in the open position of the cover the light source is in the maintenance position. In this aspect, the cover may be hinged to a rear wall of the chassis so that the light source is pivoted in a vertical plane normal to the hinge axis, which provides an efficient relationship between the source and receptors in the emit position and convenient access to the bulbs in the maintenance position.

In a preferred aspect, the receptor faces rearwardly and the light emitting bulb faces forwardly so that the bulb emits light forwardly into the receptor in the emit position, which is desirable for providing a relationship between the panel portion of the light emitting panel and the receptor to efficiently transmit light through the optical fibers from the receptor to the panel portion.

In another useful aspect, the cabinet is a cabinet of a processor which includes a processing unit and a switch is provided which is operable to turn off power to the bulb without turning off power to processing unit. Therefore, the bulb can be turned off for replacement without interrupting the operation of the processing unit. Preferably, the switch can be turned off from outside of the cabinet so that the power for the light source can be turned off before opening the cover.

A heat shield lens can be positioned between the bulb and the receptor in the emit position so as to reduce heat transmission from the bulb to the receptor and the lens may be fixed either to the cover or to the chassis, although preferably to the chassis to reduce the weight born by the cover and also protect the lens and receptor from unnecessary touching. Two or more receptors and corresponding heat shields and bulbs may be provided, depending on the intensity of light desired.

In an especially preferred form, the panel is generally parallel to the front wall of the cabinet, the receptor has a longitudinal axis which is generally perpendicular to the panel and the receptor is positioned adjacent to a side of the cabinet. The cabinet includes a chassis and a cover, and the cover is hinged to a rear wall of the chassis. The light source is mounted to the cover adjacent to a side of the cover corresponding to the side of the cabinet, and the cover is open along the side adjacent to the light source. This provides effective light transmission to the panel in the emit position and convenient replacement of the bulbs in the maintenance position.

BRIEF DESCRIPTION OF THE DRAWINGS

FIG. 1 is a front left perspective view of a processor which incorporates an illumination system of the invention;

FIG. 2 is a rear left hand view of the processor of FIG. 1 shown with a portion broken away to illustrate aspects of an illumination system of the invention;

FIG. 3 is a rear left exploded perspective view of elements of the illumination system shown in FIG. 2;

DETAILED DESCRIPTION OF THE PREFERRED EMBODIMENT

Figure 4:
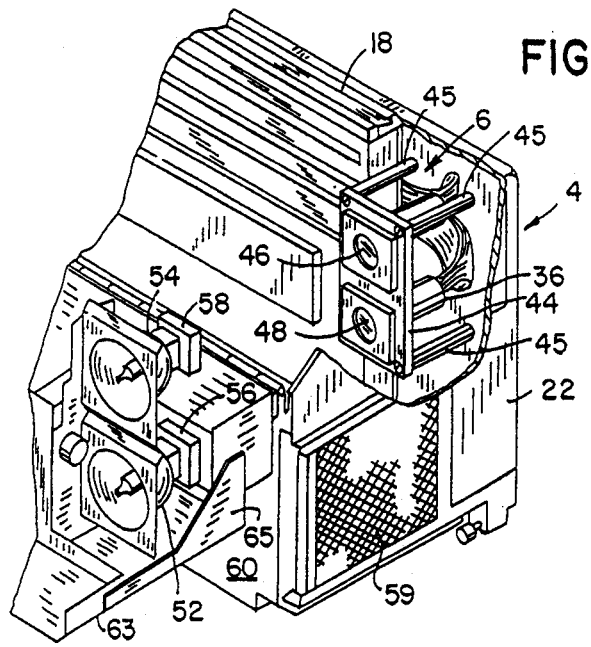
FIG. 4 is a view similar to FIG. 2 but shown with a cover of the processor swung into a maintenance position.

Referring to FIGS. 1 and 2, a processor 4 incorporating an illumination system 6 of the invention is illustrated. The processor 4 has a cabinet 8 including a cover 10 and a chassis 12. Together, the cover 10 and chassis 12 completely enclose the interior of the cabinet 8. The cabinet 8 has a front wall 14, a rear wall 16, a top wall 18, a bottom wall 20 and left and right side walls 22 and 24. The front wall 14 includes a display panel 26 for displaying visual information and button panels 28 and 30 for inputting information. The display panel 26 may be any type of display panel which requires backlighting, such as a thin film transistor display or a liquid crystal display.

The cabinet 8 houses a processing unit (not shown) for processing input information entered on the button panels 28 and 30, and for driving the display panel 26 to exhibit visual information. Any type of processing unit may be used in practicing the present invention.

Referring to FIGS. 2 and 3, the system 6 includes a light emitting panel 34 which is positioned behind the display panel 26 and mounted to the cabinet 8 so as to emit light out of the front surface of the light emitting panel 34 and through the display panel 26 out the front wall 14 of the cabinet 8. As such, information displayed by the display panel 26 is visible by a human observer from the front of the cabinet 8.

The light emitting panel 34 is preferably of the type woven from plastic optical fibers. Such panels are commercially available from Lumitex, Inc., of Cleveland, Ohio and may be made in a wide range of sizes. Referring to FIG. 3, each panel typically has at least one layer of woven optical fibers which is laminated in a panel portion 35 with a rear reflector layer 31 and a front diffuser layer 33. In the preferred embodiment, six layers of woven optical fiber mat are provided in the panel portion 35. The optical fibers 35 from the woven layers are brought together in one or more bundle portions 37 (two in the preferred embodiment) which extend from the panel portion 35. The bundle portions 37 each extend from a far edge 39 of the panel portion 35 across the back of the panel portion 35 and terminate at receptor ends 38 and 40 which are distal from the panel portion 35. At the receptor ends 38 and 40, a ferrule 36 is crimped around the end of each bundle and the ends of the fibers at the end of each ferrule 36 are polished so as to efficiently receive light from a light source.

Figure 7:
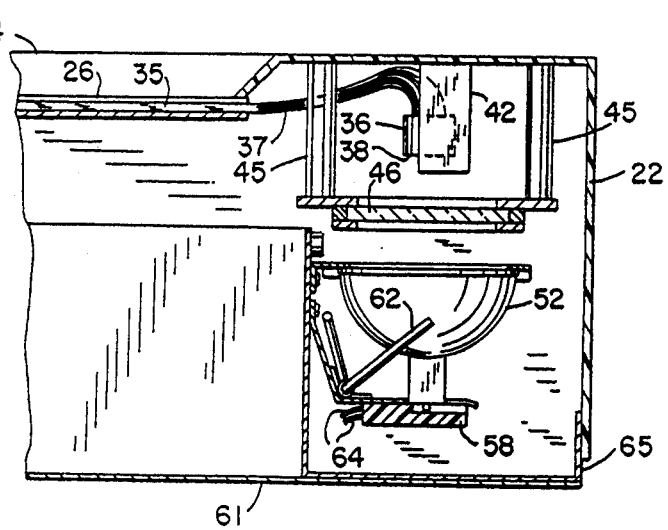
FIG. 7 is a top plan view showing the processor cabinet in section and illustrating the relationship of elements of the illumination system.

As best shown in FIG. 7, the receptors are secured to the cabinet 8 so that their axes (indicated by the arrows in FIG. 3) are generally perpendicular to the plane of the panel 34, and vertically spaced apart from each other. Each receptor 38 and 40 is secured in this orientation by any suitable means, such as bracket 42. In that orientation, each of the receptors 38 and 40 has its axis running fore and aft relative to the cabinet 8 and faces rearwardly.

Just rearward from the receptors 38 and 40, an apertured plate 44 supports heat reflective type infra-red filter lenses 46 and 48, each of which is co-axially aligned with a respective receptor 38 and 40. These lenses 46 and 48 shield the receptors 38 and 40 from much of the heat which is emitted by the light source 50, while allowing most of the light from the light source 50 to pass through them into the receptors 38 and 40. The plate 44 is secured to posts 45 which, if desired, may be molded integrally with the brackets 42 and the integrally molded part secured to the cabinet 8.

The light source 50 is mounted to the cover 10 and in the position of the cover shown in FIGS. 1, 2 and 7 supports two light bulbs 52 and 54 with the light bulb 52 co-axial with filter 46 and receptor 38 and light bulb 54 co-axial with filter 48 and receptor 40. Each bulb 52 and 54 is preferably spaced from the plate 44 a distance sufficient to allow air circulation around the bulbs for cooling. The bulbs are preferably tungsten halogen lamps with MR-16 reflectors, ANSI No. ENW, but it should be understood that other bulbs could be used to practice the invention. A fan (not shown) may be provided if desired to circulate cooling air over the bulbs 52 and 54. A filter screen 59 may also be provided to clean air entering the cabinet 8.

The bulbs 52 and 54 are received within standard sockets compatible with the bulbs 52 and 54, such as the sockets 56 and 58 shown, which are mounted to the cover 10 by suitable fasteners. The position of the bulbs 52 and 54 shown in FIGS. 2 and 7 is hereinafter referred to as the emit position because in that position the bulbs 52 and 54 are in position to direct their respective beams forwardly through the filter lenses 46 and 48 and into the respective receptors 38 and 40 for illuminating the light emitting panel 34 and therefore backlighting the display panel 26.

The cover 10 is pivotably mounted by hinge 67 to the top of rear panel 60 of the chassis 12 so that the cover can be swung between the closed position illustrated in FIGS. 1 and 2 and the open position illustrated in FIG. 4. The cover 10 has a rear panel 61 which together with the chassis rear panel 60 completes the rear wall 16 of the cabinet 8 and has a top wall 63 which largely defines the top wall 18 of the cabinet 8. The cover 10 also has a side panel 65 along the left side of the cabinet 8 where the light source 50 is positioned, but the side panel 65 is formed so as to provide an opening adjacent to the light bulbs 52 and 54 so that when the cover 10 is open the bulbs 52 and 54 can be removed laterally past the opening in the side panel 65.

Figure 6:
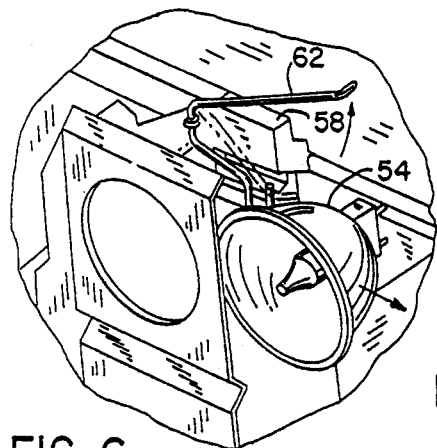
FIG. 6 is a detail view similar to FIG. 4 showing the removal of a light bulb from the socket illustrated.

In the closed position, the cover 10 is secured shut by thumb screws 70 or any other suitable means. In the open position, the light source 50 is repositioned approximately 180° from the emit position to a maintenance position in which easy access is allowed to each of the bulbs 52 and 54 for replacing them. A lever 62 is normally provided as part of each of the sockets 56 and 58 which when rotated as indicated in FIG. 6 pushes its associated bulb 52 or 54 out of the socket 56 or 58 to disengage the bulb from the socket. Thereafter, a new bulb may be easily inserted. The removal and reinsertion of bulbs from the sockets 56 and 58 is facilitated by the illumination system 6 being positioned to the side of the cabinet 8, and the cover 10 being open along the side of the illumination system so that the bulbs can be removed and reinserted from that side.

Figure 5:
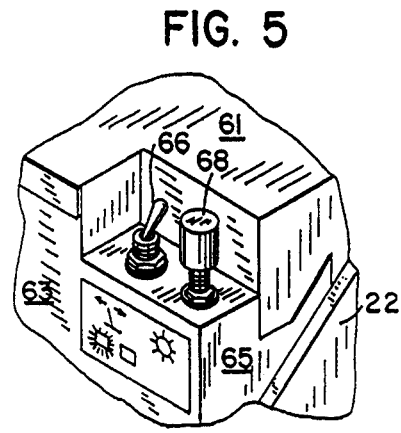
FIG. 5 is a detail view showing the left rear corner of the processor with the cover closed.
Figure 8:
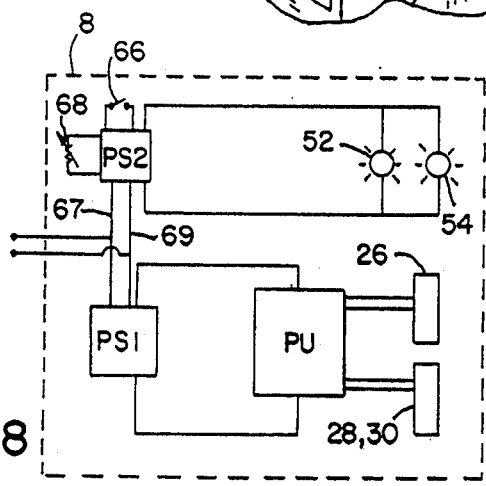
FIG. 8 is a schematic block diagram of circuits for the processor shown in FIG. 1.

As shown in FIG. 7, power for the sockets 56 and 58 for energizing the bulbs 52 and 54 is provided through wires 64. The wires 64 are preferably connected to a power supply that can be controlled by an on/off switch 66 (FIGS. 5 and 8), such as of the toggle type shown, and a dimmer potentiometer 68, so as to allow turning the bulbs 52 and 54 on or off using the switch 66 and when on to allow dimming of the illumination provided by the bulbs 52 and 54. The sockets 56 and 58 may be connected to the switch 66 and dimmer potentiometer 68 by any suitable well known means, and power may be provided to the sockets 56 and 58 by any suitable power supply, which may be the same power supply as the power supply PS1 (FIG. 8) for the processing unit PU or a separate power supply PS2 as illustrated in FIG. 8. If so, the power supplies PS1 and PS2 can have common power inputs 67 and 69. The power supplies may also be mounted to the cover 10. As illustrated in FIG. 8, the dimmer potentiometer 68 is a variable resistor which is adjustable to vary the voltage output of the power supply PS2, so as to adjust the intensity of the illumination provided by the bulbs 52 and 54. Other power supply arrangements may also be employed to practice the invention.

Preferably the on/off switch 66 only controls the power to the light bulbs 52 and 54 (See FIG. 8), and does not control the main power for the processor 4 and more particularly does not control the power to the processing unit PU inside the processor 4. Therefore, when a bulb 52 or 54 burns out, the power switch 66 can be switched off, the cover 10 opened to the position shown in FIG. 4, the burned out bulb replaced, the cover 10 closed and secured, and the power switch 66 turned back on, without interrupting the operation of the processing unit.

A preferred embodiment of the invention has been described in considerable detail. Many modifications and variations incorporating the spirit of the invention will be apparent to those skilled in the art. For example, the bulbs 52 and 54, lenses 46 and 48 and receptors 38 and 40 could have their axes directed laterally (side to side) or vertically, so long as they were coaxially aligned when the cover is closed. Therefore, the invention should not be limited to the embodiment described, but should be described by the claims which follow.

We claim:

1. An illumination system for a light emitting panel which back lights an output display device for a processor, the light emitting panel including optical fibers which terminate in at least one receptor for receiving light from the illumination system, the illumination system comprising:

a cabinet with an interior volume for housing the processor and for mounting the receptor of the light emitting panel at a fixed location within said interior volume;

an access cover movably mounted on the cabinet so as to be movable between open and closed positions, in which said interior volume of the cabinet is alternately accessible and inaccessible when the access cover is in the open and closed positions, respectively;

a light source mounted on the access cover at a position where the light source emits light into said at least one receptor of the light emitting panel when the access cover is in the closed position, and where the light source is externally accessible when the access cover is in the open position;

an electrical input for supplying electrical power for utilization within the cabinet;

a first power supply connected to the electrical input for supplying electrical power to the light source;

a second power supply connected to the electrical input for supplying electrical power to the processor; and an illumination control connected to the first power supply which is operable to selectively alter the electrical power delivered to the light source to provide at least an on state and an off state for the light source, in which electrical power delivered to the light source in the off state is a low power level, including a zero power level, causing the light source to be substantially off and in which electrical power delivered to the light source in the on state is a nominal operating power level, causing the light source to provide operative illumination to the light emitting panel;

wherein operation of the second power supply and the processor is unaffected when the illumination control alternates the light source between said on and off states.

2. The illumination system as recited in claim 1, wherein said illumination control includes a switch mounted on said access cover, the switch including an operating element which is movable to effect a change between said on and off states of the illumination control, and in which at least the operating element of said switch is accessible from outside of the cabinet interior volume when the access cover is in the closed position.

3. The illumination system as recited in claim 1, further comprising a heat shield lens positioned between said light source and said at least one receptor when said access cover is in said closed position.

4. The illumination system as recited in claim 3, wherein said heat shield lens is mounted in a fixed position relative to said at least one receptor.

5. The illumination system as recited in claim 1, wherein said at least one receptor comprises a plurality of separate receptors, and the light source comprises a plurality of individual light bulb and reflector assemblies, in which each light bulb and reflector assembly is arranged to emit light into one of said plurality of separate receptors.

6. The illumination system as recited in claim 1 in which the access cover is connected to the cabinet by a hinge which provides for rotational movement of the access cover between the open and closed positions.

7. The illumination system as recited in claim 6, wherein said hinge is attached to the cabinet along a rear wall of said cabinet.

8. The illumination system as recited in claim 7, wherein said light emitting panel is generally parallel to a front wall of said cabinet, said receptor has a longitudinal axis which is generally perpendicular to said light emitting panel and said receptor is positioned adjacent to a cabinet side wall which forms one side of said cabinet, said light source is mounted to said access cover adjacent to an open end of said access cover, wherein the cabinet side wall closes off the open end of the access cover when the access cover is in the closed position, and the light source is accessible through the open end of the access cover when the access cover is in the open position.

9. The illumination system as recited in claim 6, wherein said light emitting panel has a bundle portion and a panel portion, and said bundle portion extends form a far edge of said panel portion across a back side of said portion to said receptor.

10. The illumination system as recited in claim 1 in which the illumination control comprises a variable dimmer control mounted on said access cover, the variable dimmer control including an operating element which is movable to effect a change between said on and off states of the illumination control, and in which at least the operating element of said variable dimmer control is accessible from outside of the cabinet interior volume when the access cover is in the closed position.

* * * * *